US009663136B2

(12) United States Patent
Stinebring et al.

(10) Patent No.: US 9,663,136 B2
(45) Date of Patent: May 30, 2017

(54) STEERING COLUMN HAVING ANTI-ROTATION FEATURE

(71) Applicant: Steering Solutions IP Holding Corporation, Saginaw, MI (US)

(72) Inventors: Scott A. Stinebring, Auburn, MI (US); Robert D. Maida, Pinconning, MI (US); Jacob A. Caverly, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/624,687

(22) Filed: Feb. 18, 2015

(65) Prior Publication Data

US 2015/0232117 A1 Aug. 20, 2015

Related U.S. Application Data

(60) Provisional application No. 61/942,217, filed on Feb. 20, 2014.

(51) Int. Cl.
*B62D 1/19* (2006.01)
*B62D 1/181* (2006.01)

(52) U.S. Cl.
CPC ............. *B62D 1/195* (2013.01); *B62D 1/181* (2013.01)

(58) Field of Classification Search
CPC ............................... B62D 1/192; B62D 1/185
See application file for complete search history.

(56) References Cited

U.S. PATENT DOCUMENTS

| 3,501,993 | A | 3/1970 | Swenson |
| 5,520,416 | A | 5/1996 | Singer, III et al. |
| 5,722,299 | A | 3/1998 | Yamamoto et al. |
| 5,848,557 | A | 12/1998 | Sugiki et al. |
| 6,142,485 | A | 11/2000 | Muller et al. |
| 6,328,343 | B1 | 12/2001 | Hosie et al. |
| 7,516,991 | B1 | 4/2009 | Cheng |
| 8,935,968 | B2 * | 1/2015 | Sugiura ................. B62D 1/192 74/493 |
| 9,022,426 | B2 * | 5/2015 | Sakata ..................... B62D 1/18 280/775 |
| 9,022,427 | B2 | 5/2015 | Schnitzer |
| 9,428,213 | B2 | 8/2016 | Tinnin |
| 2003/0185648 | A1 | 10/2003 | Blaess |
| 2003/0209897 | A1 | 11/2003 | Manwaring et al. |
| 2003/0227163 | A1 * | 12/2003 | Murakami ............. B62D 1/184 280/777 |
| 2004/0200306 | A1 | 10/2004 | Schafer |
| 2007/0137379 | A1 | 6/2007 | Sanji et al. |

(Continued)

FOREIGN PATENT DOCUMENTS

JP 2011057020 A 3/2011

*Primary Examiner* — Faye M Fleming
(74) *Attorney, Agent, or Firm* — Cantor Colburn LLP

(57) ABSTRACT

A steering column for a vehicle having an anti-rotation feature is provided. The steering column includes a lower jacket and an upper jacket configured for telescopic movement relative to the lower jacket. A telescope drive bracket is coupled to the upper jacket. A telescope actuator is operably coupled to the telescope drive bracket and configured to telescopically move the upper jacket relative to the lower jacket.

19 Claims, 3 Drawing Sheets

(56) References Cited

U.S. PATENT DOCUMENTS

| | | | |
|---|---|---|---|
| 2007/0194563 A1* | 8/2007 | Menjak | B62D 1/195 280/777 |
| 2008/0106086 A1 | 5/2008 | Shimoda | |
| 2009/0200783 A1 | 8/2009 | Cymbal | |
| 2012/0125139 A1* | 5/2012 | Tinnin | B62D 1/195 74/493 |
| 2012/0125140 A1* | 5/2012 | Ridgway | B62D 1/195 74/493 |
| 2013/0205933 A1 | 8/2013 | Moriyama | |
| 2013/0233117 A1 | 9/2013 | Read et al. | |
| 2014/0109713 A1 | 4/2014 | Bodtker | |
| 2014/0109714 A1 | 4/2014 | Bodtker | |
| 2014/0137694 A1* | 5/2014 | Sugiura | B62D 1/185 74/493 |
| 2014/0147197 A1* | 5/2014 | Yoshida | B62D 1/20 403/359.1 |
| 2015/0028574 A1* | 1/2015 | Meyer | B62D 7/224 280/775 |
| 2015/0069747 A1 | 3/2015 | Sharman et al. | |
| 2015/0166093 A1 | 6/2015 | Moriyama et al. | |
| 2015/0239490 A1* | 8/2015 | Sakata | B62D 1/192 74/493 |
| 2015/0251683 A1 | 9/2015 | Caverly et al. | |
| 2016/0046318 A1 | 2/2016 | Stinebring et al. | |

\* cited by examiner

STEERING COLUMN HAVING ANTI-ROTATION FEATURE

CROSS-REFERENCE TO RELATED APPLICATION

This application is based upon and claims benefit of the filing date of U.S. Provisional Patent Application 61/942,217 filed on Feb. 20, 2014 and entitled "Steering Column Having Anti-Rotation Feature," which is incorporated herein by reference in its entirety.

FIELD OF INVENTION

The subject invention relates to a steering column of a vehicle. More specifically, the invention relates to such a steering column telescopically adjustable and collapsible along a longitudinal axis.

BACKGROUND OF INVENTION

A known telescopically adjustable steering column of a vehicle includes a telescope actuator and column jacket having lower and upper jackets. The column jacket is longitudinally moveable and internally collapsible along a longitudinal axis between a "full out" position in which the column jacket is fully extended and a "full in" position in which the column jacket is fully retracted. This collapsibility is energy-absorbing (E/A) and reduces likelihood of injury to a driver of the vehicle during a crash thereof.

However, various functions of the steering column—including telescopic motion, elimination of unwanted rotation of the upper jacket, E/A collapse of the steering column, and axial movement of the jackets relative to each other—are achieved using multiple respective components. Each component performs only a single specific function (e.g., telescope and collapse bushings are respectively used for the telescopic and E/A movements).

SUMMARY OF INVENTION

The subject invention provides a steering column for a vehicle having an anti-rotation feature. The steering column includes a lower jacket and an upper jacket configured for telescopic movement relative to the lower jacket. A telescope drive bracket is coupled to the upper jacket. A telescope actuator is operably coupled to the telescope drive bracket and configured to telescopically move the upper jacket relative to the lower jacket.

The drive bracket defines a geometry thereof to prevent tangential rotation of the drive bracket about an axis established by pivot screws and a corresponding actuator trunnion during an energy-absorbing (E/A) function.

Also, the drive bracket, having a complimentary geometry with respect to and positioned within confines of a mating slot of the lower jacket, prevents tangential rotation of the upper jacket relative to a mounting bracket and rotation of an upper head of the steering column relative to the mounting bracket.

And, the drive bracket defines base slots allowing for connection of the drive bracket to the upper jacket by shearable fasteners designed to shear during the E/A function and de-couple the drive bracket from an end of an E/A strap and from the upper jacket and another end of the E/A strap.

Furthermore, the drive bracket provides an attachment (grounding) point for the E/A strap during collapse.

In addition, the drive bracket transmits motion of the actuator to a telescoping member (i.e., the upper jacket) and E/A components, which move with the upper jacket independently of telescopic position.

Moreover, the drive bracket allows for elimination of a fixed upper-and-lower-jacket assembly and the upper jacket to be telescoped within the lower jacket while maintaining full E/A function.

Accordingly, the invention includes the drive bracket, which is a single device that transmits motion between the actuator and movable jacket for telescopic motion, interacts with the lower jacket to eliminate the unwanted rotation of the upper jacket, and provides the grounding link for the E/A strap during collapse of the steering column. A telescope bushing can be used that allows for relative axial movement between the upper and lower jackets and telescopic and E/A movements.

BRIEF DESCRIPTION OF EACH FIGURE OF DRAWING

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION OF EMBODIMENTS OF INVENTION

Referring now to the Figures, wherein like numerals indicate corresponding parts, the subject invention is described below with reference to specific non-limiting exemplary embodiments thereof without limiting same. A non-limiting exemplary embodiment of a steering column having an anti-rotation feature according to the invention is shown generally at 10. The steering column 10 is for a vehicle (not shown) and extends along a longitudinal axis "A." The steering column 10 is adjustable in a telescopic direction parallel to the longitudinal axis "A" (i.e., the steering column 10 is axially adjustable along the longitudinal axis "A").

Figure 1:
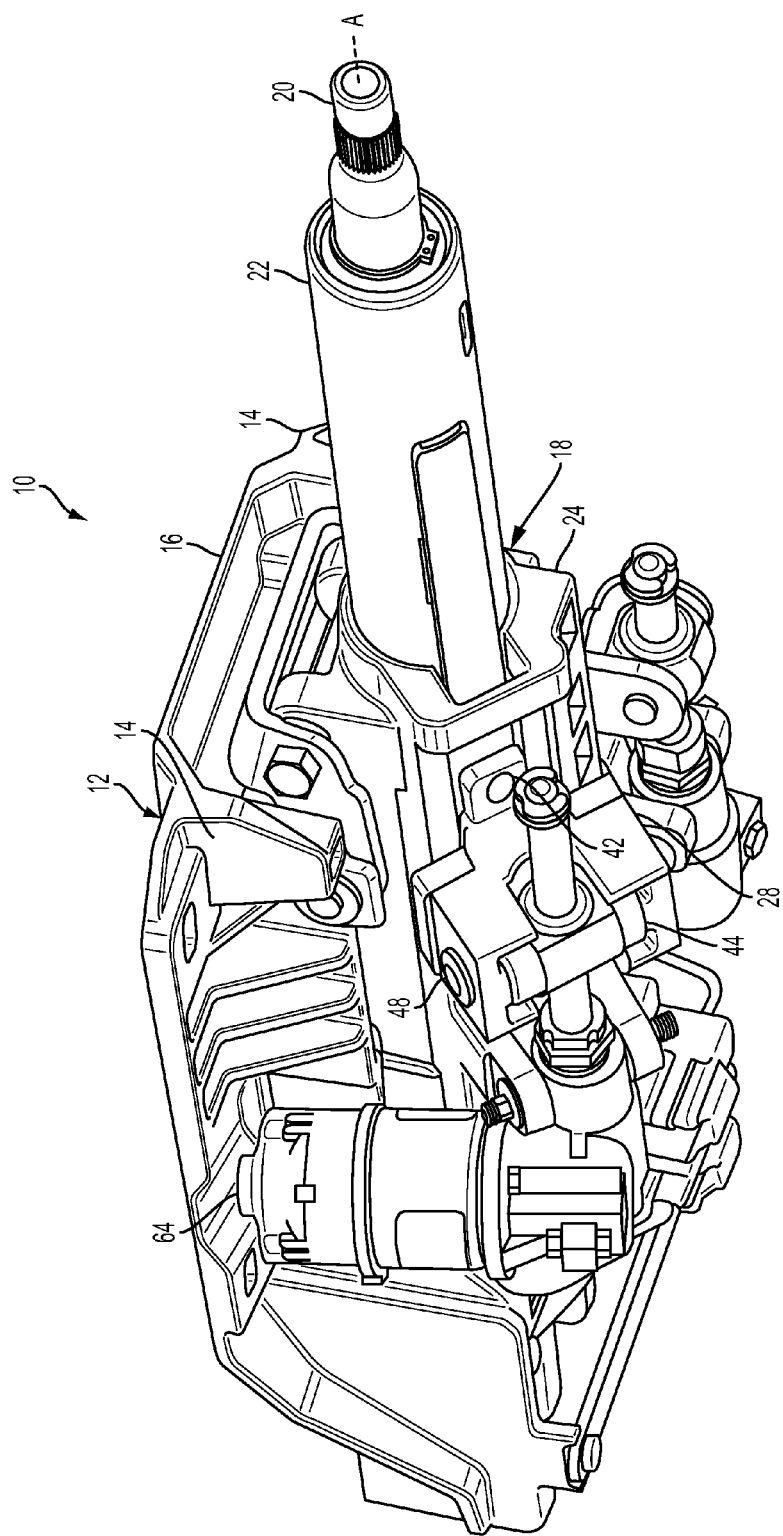
FIG. 1 is a perspective view of a non-limiting exemplary embodiment of a steering column according to the invention in an extended position.

More specifically, as shown in FIG. 1, the steering column 10 includes a mounting bracket (i.e., a rake bracket), generally indicated at 12. The mounting bracket 12 is configured for attachment to the vehicle and includes a pair of opposed side plates 14 and a top plate 16 attached to and extending between respective upper portions of the side plates 14. It should be appreciated that the mounting bracket 12 may be configured in several different configurations for several different manners of attachment to several different vehicles. Accordingly, it should be further appreciated that an exact configuration of the mounting bracket 12 and a manner of attaching the mounting bracket 12 to the vehicle is not described herein.

Figure 2:
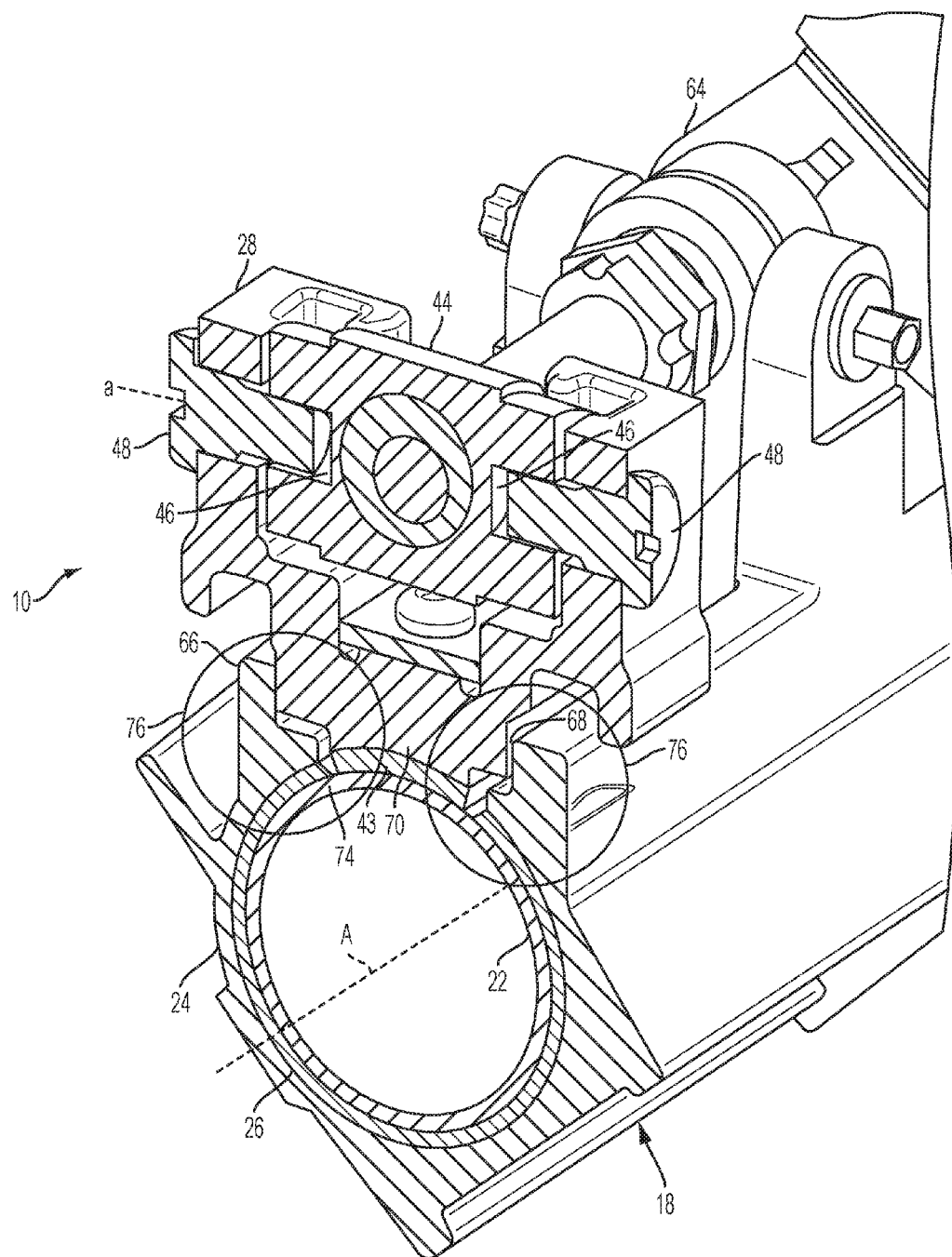
FIG. 2 is a perspective view partially in cross-section of the steering column of FIG. 1 in an uncollapsed and nominal rake and telescopic position.
Figure 3:
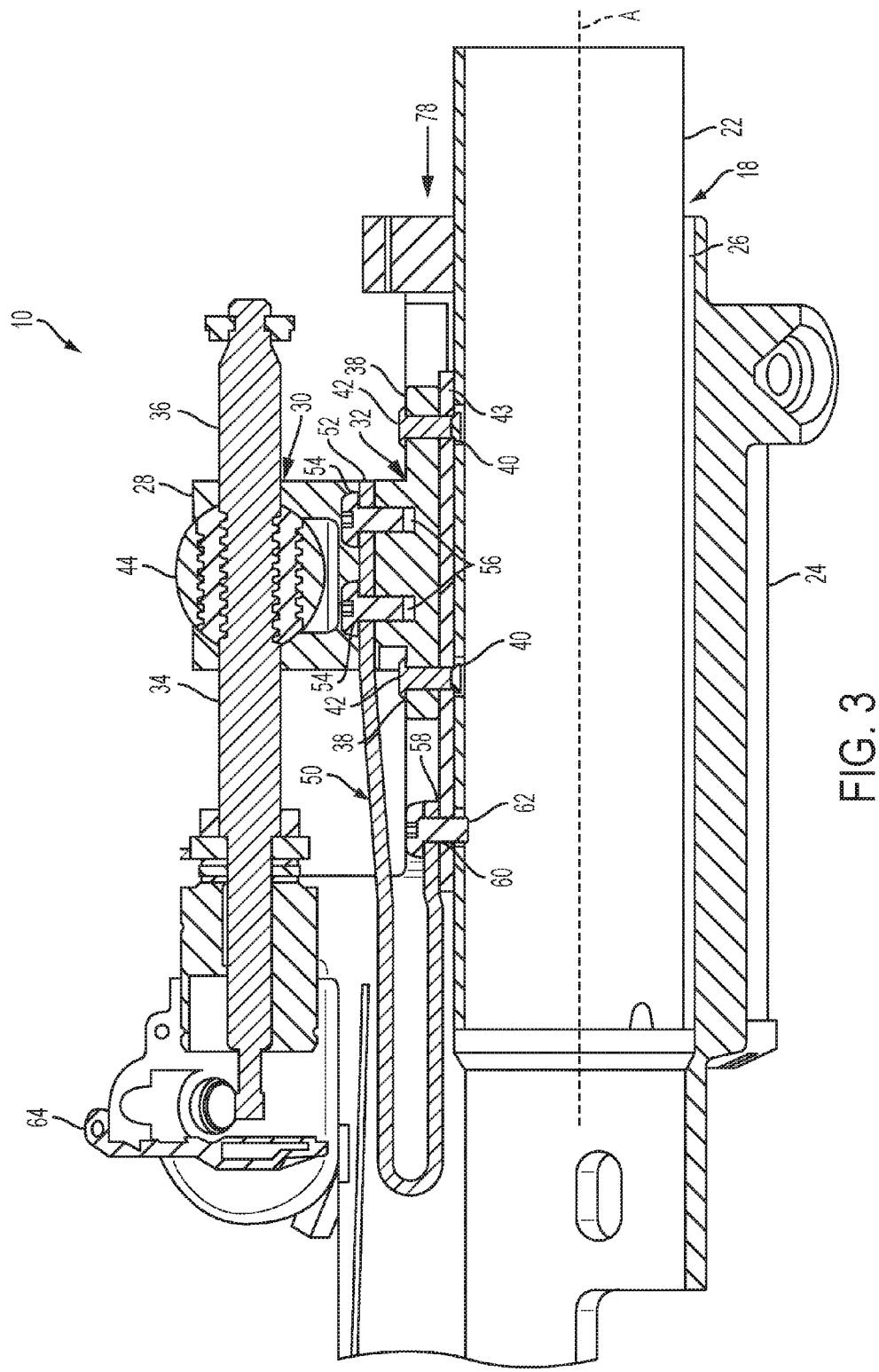
FIG. 3 is a partial cross-sectional view along a longitudinal axis of the steering column of FIG. 1 in a nominal rake and telescopic position.

As shown in FIGS. 1-3, the steering column 10 also includes a column jacket, generally indicated at 18, coupled to the mounting bracket 12 and disposed between the side plates 14 and up to the top plate 16 of the mounting bracket 12. It should be appreciated that the column jacket 18 can have any suitable relationship with the mounting bracket 12.

Throughout this specification, the term "attach," "attachment," "coupled," "coupling," "mount," or "mounting" shall be interpreted to mean that one structural component or element is in some manner connected to or contacts another element—either directly or indirectly through at least one intervening structural element—or is integral with the other structural element. Accordingly, it should be appreciated that the column jacket 18 may be connected to the mounting bracket 12 in several different ways using at least one different structural element interconnecting the column jacket 18 and mounting bracket 12 to each other.

A steering shaft 20 (FIG. 1) is rotatably disposed within the column jacket 18. A steering wheel (not shown) is configured to be mounted to the steering shaft 20 as is well known to those skilled in the related art. The column jacket 18 and steering shaft 20 extend along the longitudinal axis "A." The steering shaft 20 is located radially inward from and generally concentric with the column jacket 18. The column jacket 18 is movable during normal operations of the vehicle to telescopically adjust a position of the steering wheel relative to the mounting bracket 12 along the longitudinal axis "A."

Toward that end and referring to FIGS. 1-3, the column jacket 18 includes a radially inward upper jacket 22 and a radially outward lower jacket 24. The lower jacket 24 is telescopically disposed over the upper jacket 22. In this way, energy-absorbing (E/A) movement (i.e., E/A collapsibility) of the upper jacket 22 along the longitudinal axis "A" within the lower jacket 24 is provided. The upper jacket 22 is shown in the uncollapsed position in the Figures.

As shown in FIGS. 2 and 3, the column jacket 18 also includes a single collapse/telescope bushing 26 for allowing the upper and lower jackets 22, 24 to move axially with respect to each other (i.e., telescopic and E/A movement). The bushing 26 is interposed between an outer periphery of the upper jacket 22 and an inner periphery of the lower jacket 24. The bushing 26 is configured to reduce friction acting between the upper and lower jackets 22, 24 so that the upper jacket 22 can be slid on an inner periphery of the bushing 26 during telescopic action between the upper and lower jackets 22, 24.

It should be appreciated that each of the column jacket 18 (including the upper and lower jackets 22, 24 and bushing 26), steering shaft 20, and steering wheel can have any suitable structure and the column jacket 18 (including the lower and upper jackets 22, 24 and bushing 26), steering shaft 20, and steering wheel can have any suitable relationship with each other. It should be further appreciated that the column jacket 18 can define at least one rake slot (not shown) extending generally transverse to the longitudinal axis "A" for permitting adjustment of the steering wheel in a vertical direction (i.e., tilt adjustment) as is well known to those skilled in the related art.

It should be appreciated that a rake bolt (i.e., shaft) (not shown) can be coupled to the mounting bracket 12 and extend through at least one telescope slot (not shown) along an axis extending generally transverse to the longitudinal axis "A." In such case, during the longitudinal movement of the column jacket 18, the rake bolt may not move with the column jacket 18 and remain stationary along the longitudinal axis "A" relative to the mounting bracket 12. It should be further appreciated that the steering column 10 can also include a locking mechanism (not shown) configured to secure a longitudinal position of the column jacket 18 relative to the mounting bracket 12 along the longitudinal axis "A." For example, the locking mechanism and a lever (not shown) can be coupled to the rake bolt such that the lever rotates the rake bolt to actuate the locking mechanism between a locked position (i.e., fixing a position of the column jacket 18 relative to the mounting bracket 12) and an unlocked position (i.e., permitting adjustment or movement of the column jacket 18 relative to the mounting bracket 12). It should be further appreciated that there are several different locking mechanisms known to those skilled in the related art—such as axial camming mechanisms—suitable for use with the steering column 10. Accordingly, it should be further appreciated that an exact type and configuration of the locking mechanism is not described in detail herein.

Referring back to the Figures, the steering column 10 also includes a telescope drive bracket 28 attached to the lower jacket 24 and disposed distal the upper jacket 22. Geometry of the drive bracket 28 is configured to limit rotation of the drive bracket 28 during E/A function.

More specifically and as shown in FIG. 3, the drive bracket 28 is diametrically opposed to the upper jacket 22 and defines body and base portions, generally indicated at 30, 32. An aperture 34 is also defined extending entirely through the body portion 30 parallel to the longitudinal axis "A" and configured to matingly receive a drive bolt or leadscrew 36. FIG. 3 shows the leadscrew 36 extending to, through, and out the aperture 34. In an aspect of this embodiment, the aperture 34 can be sized to permit the leadscrew 36 to move freely in an axial direction through the aperture 34. The base portion 32 has at least one leg 38 that, in turn, defines at least one slot 40 configured to matingly receive a shear rivet 42. In the embodiment illustrated in FIG. 3, the base portion 32 has a pair of opposed legs 38 that, in turn, define a corresponding pair of opposed slots 40 configured to matingly receive respective shear rivets 42 (one shown in FIG. 1) configured to shear during a crash of the vehicle. The slots 40 and shear rivets 42 extend entirely through the respective legs 38 toward the upper jacket 22 and generally normal to the longitudinal axis "A." A plate 43 is located between the drive bracket 28 and upper jacket 22. More specifically, the plate 43 is supported on—e.g., welded onto—the upper jacket 22 to accept the shear rivets 42 to connect the drive bracket 28. It should be appreciated that each of the slot 40 and shear rivet 42 may have any suitable cross-sectional shape, such as generally circular or rectangular. It should be further appreciated that the plate 43 can have any suitable shape, size, and structure and relationship with the drive bracket 28 and upper jacket 22.

The drive bracket 28 is a single component or device of the steering column 10 that, as described below, provides an anti-rotation feature that eliminates unwanted rotation of an upper head (not shown) of the steering column 10 (the upper head being attached to an end of the upper jacket 22 located proximate the steering shaft 20). The drive bracket 28 also enables the use of the bushing 26 for both telescopic and E/A movement.

As shown in FIGS. 1-3, the steering column 10 also includes a telescope actuator trunnion 44 attached to the drive bracket 28. The geometry of the drive bracket 28 is specific such that the drive bracket 28 interacts with the actuator trunnion 44 to reduce unwanted movement of the drive bracket 28 during E/A movement. More specifically, the actuator trunnion 44 is disposed adjacent the drive bracket 28 and distal the upper jacket 22. In an aspect, the actuator trunnion 44 is disposed diametrically opposed the upper jacket 22 relative the drive bracket 28.

As shown in FIG. 2, the body portion 30 defines at least one slot 46 configured to receive a respective pivot bolt or screw 48. In an aspect, a pair of opposed slots 46 are configured to matingly receive respective pivot screws 48 (one shown in FIG. 1 and both shown in FIG. 2). The pivot screws 48 extend through the slots 46 and couple the actuator trunnion 44 to the drive bracket 28. More specifically, the pivot screws 48 are driven into the drive bracket 28, and a smooth section of each pivot screw 48 locates the actuator trunnion 44 relative to an axis "a" defined by the pivot screws 48 within the drive bracket 28.

As shown in FIG. 3, the steering column 10 also includes an E/A strap, generally indicated at 50. The drive bracket 28 provides a load path for the E/A strap 50 during E/A movement (stroke of the steering column 10). More specifically, the drive bracket 28 is connected to a first end 52 of the E/A strap 50 through at least one pin 54 captured in a slot 56. In the embodiment illustrated in FIG. 3, the drive bracket 28 is connected to the first end 52 of the E/A strap 50 through a pair of pins 54 captured in respective opposed slots 56. The pins 54 and slots 56 extend toward the base portion 32 of the drive bracket 28 and generally normal to the longitudinal axis "A." Although not shown, the pins 54 and slots 56 can extend to the plate 43, which can accept the pins 54 to fasten the first end 52 of the E/A strap 50. It should be appreciated that each pin 54 and slot 56 may have any suitable cross-sectional shape, such as generally circular or rectangular.

A second end 58 of the E/A strap 50 is configured to be coupled directly to the plate 43. Toward that end, the second end 58 defines at least one slot 60 configured to matingly receive a pin 62. The slot 60 and pin 62 extend generally normal to the longitudinal axis "A," through the plate 43, and to the upper jacket 22 to connect the second end 58 of the E/A strap 50 to the upper jacket 22. It should be appreciated that each of the slot 60 and pin 62 may have any suitable cross-sectional shape, such as generally circular or rectangular.

It should be appreciated that the drive bracket 28, actuator trunnion 44, and E/A strap 50, in general (and body and base portions 30, 32, aperture 34, leadscrew 36, and legs 38, in particular), can have any suitable structure. It should be further appreciated that the drive bracket 28, actuator trunnion 44, and E/A strap, in general (and body and base portions 30, 32, aperture 34, leadscrew 36, legs 38, slots 40, 46, 56, 60, shear rivets 42, pivot screw 48, and pins 54, 62, in particular), can have any suitable relationship with each other. It should be further appreciated that the steering column can include any suitable number of slots 40, 46, 56, 60 and corresponding shear rivets 42, pivot screw 48, and pins 54, 62.

As shown in FIGS. 1-3, the steering column 10 also includes a telescope actuator 64. The drive bracket 28 provides a link between the actuator 64 and movable portion of the steering column 12 for telescopic movement. More specifically, the drive bracket 28 is configured to transmit linear motion from the actuator 64 via the leadscrew 36 through the actuator trunnion 44 to the upper jacket 22 during telescopic adjustment of the steering column 10. In particular, when telescopic movement is electrically commanded, the actuator 64 is operated to vary a telescopic relationship between the upper and lower jackets 22, 24. When the actuator 64 is not being operated, the upper and lower jackets 22, 24 are held against telescopic movement relative to each other, and the steering column 10 is effective to prevent telescopic (and/or tilt) adjustment of the steering wheel. In an aspect, a motor in the actuator 64 is a reversible electric motor (not shown).

It should be appreciated that the upper jacket 22, drive bracket 28, leadscrew 36, actuator trunnion 44, and actuator 64 can have any suitable relationship with each other. It should be further appreciated that, if desired, a reversible hydraulic or pneumatic motor may be used in the actuator 64.

As shown in FIG. 2, an upper portion 66 of the lower jacket 24 defines an opening 68 into which a bottom portion 70 of the drive bracket 28 is positioned. More specifically, the plate 43 is disposed upon an upper portion 74 of the upper jacket 22 between opposed sides of the upper portion 66 of the lower jacket 24, and the bottom portion 70 of the drive bracket 28 sits on the plate 43. The opening 68, in turn, defines at least one minimal clearance 76 allowing for linear motion of the upper jacket 22 relative the lower jacket 24. In the example shown, a pair of opposed minimal clearances 76 are defined. However, the drive bracket 28 reduces tangential motion of the upper jacket 22, thus a tangential position of the upper head of the steering column 10 is maintained.

It should be appreciated that each of the opening 68 and minimal clearances 76 can define any suitable shape and size. It should be further appreciated that the upper portion 66 of the lower jacket 24, upper portion 74 of the upper jacket 22, and bottom portion 70 of the drive bracket 28 can have any suitable relationship with each other. It should be further appreciated that the opening 68 can define any suitable number of minimal clearances 76.

In a crash of the vehicle, for example (where a force is exerted on the steering shaft 20 in the direction of arrow 78 shown in FIG. 3), the shear rivets 42 shear off, and the drive bracket 28, pins 54, and actuator 64 retain the first end 52 of the E/A strap 50 while the second end 58 of the E/A strap 50 moves with the upper jacket 22. Geometry of the drive bracket 28 limits rotation of the drive bracket 28 about the axis "a" defined by the pivot screws 48 due to offset loads during the crash. More specifically, the drive bracket 28 defines at least one generally flat surface that interfaces with a corresponding generally flat surface of the actuator trunnion 44. The opposing surfaces limit a degree of freedom allowed between the drive bracket 28 and actuator trunnion 44. This provides a smooth, controlled load path for the E/A strap 50 during stroking of the steering column 10 for energy-absorption.

As the E/A strap 50 is pulled by the upper jacket 22 via the pin 62, the E/A strap 50 reacts against the pins 54 through the corresponding slots 56, causing a moment about the axis "a" defined by the pivot screws 48. The interface between the actuator trunnion 44 and drive bracket 28 reacts against this moment and prevents the drive bracket 28 from rotating about the axis "a." (If the interface were free to rotate, a delay in an onset of E/A loads would result as the base portion 32 of the drive bracket 28 would undesirably rotate about the axis "a" with movement of the upper jacket 22 until the rotation of the drive bracket 28 eliminated the moment.)

The drive bracket 28 is a single component or device of the steering column 10 that provides a link between the actuator 64 and movable portion of the steering column 12 for telescopic movement, an anti-rotation feature that eliminates unwanted rotation of the upper head of the steering column 10, and a load path for the E/A strap 50 during E/A movement (stroke of the steering column 10). In addition, the geometry of the drive bracket 28 is specific such that the drive bracket 28 interacts with the actuator trunnion 44 to reduce the undesired movement of the drive bracket 28 during the E/A movement. Moreover, the drive bracket 28 allows the use of the bushing 26 for both the telescopic movement as well as the E/A movement.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

Having thus described the invention, it is claimed:

1. A steering column comprising:
   a lower jacket;
   an upper jacket configured for telescopic movement relative to the lower jacket;
   a telescope drive bracket coupled to the upper jacket by at least one shear pin;
   a telescope actuator operably coupled to the telescope drive bracket and configured to telescopically move the upper jacket relative to the lower jacket; and
   an energy-absorbing strap having a first end directly coupled to the drive bracket and a second end coupled to the upper jacket.

2. The steering column according to claim 1, wherein the telescope drive bracket is disposed distal the upper jacket.

3. The steering column according to claim 1, further comprising a mounting bracket configured for attachment to a vehicle.

4. The steering column according to claim 3, wherein the mounting bracket includes a pair of opposed side plates and a top plate attached to and extending between respective upper portions of the side plates.

5. The steering column according to claim 4, wherein the lower jacket is coupled to the mounting bracket and disposed between the side plates and up to the top plate of the mounting bracket.

6. The steering column according to claim 5, further comprising a steering shaft rotatably disposed within the column jacket and to which a steering wheel is configured to be mounted.

7. The steering column according to claim 6, wherein the column jacket and steering shaft extend along a longitudinal axis, the steering shaft is located radially inward from and generally concentric with the column jacket, and the column jacket is movable to telescopically adjust a position of the steering wheel relative to the mounting bracket along the longitudinal axis.

8. The steering column according to claim 5, further comprising a telescope bushing configured to enable the lower and upper jackets to move axially with respect to each other.

9. The steering column according to claim 8, wherein the bushing is interposed between an outer periphery of the upper jacket and an inner periphery of the lower jacket and configured to reduce friction acting between the lower and upper jackets so that the upper jacket can be slid on an inner periphery of the bushing during telescopic movement between the lower and upper jackets.

10. The steering column according to claim 1, wherein the telescope drive bracket comprises a body portion that includes a pair of opposed slots, an actuator trunnion is disposed within an opening of the body portion with opposite ends proximate the opposed slots and coupled along an axis "a" defined by the pivot pins to the drive bracket, and wherein the drive bracket and actuator trunnion each include at least one interfacing surface that together define an anti-rotation feature to prevent rotation of the drive bracket about axis "a" upon release of the shear pin.

11. A steering column comprising:
    a lower jacket;
    an upper jacket configured for telescopic movement along a longitudinal axis relative to the lower jacket;
    a telescope drive bracket coupled to the upper jacket;
    a telescope actuator operably coupled by a lead screw to the telescope drive bracket and configured to telescopically move the upper jacket relative to the lower jacket, the lead screw extending parallel to the longitudinal axis; and
    a telescope actuator trunnion coupled to the lead screw and the drive bracket, the telescope actuator trunnion is disposed distal the lower jacket.

12. The steering column according to claim 11, wherein the telescope drive bracket is positioned proximate to an opening defined by the lower jacket to define at least one minimal clearance allowing for linear and tangential motion of the upper jacket such that the drive bracket reduces tangential motion of the upper jacket.

13. A steering column comprising:
    a lower jacket;
    an upper jacket configured for telescopic movement relative to the lower jacket;
    a telescope drive bracket coupled to the upper jacket;
    a telescope actuator operably coupled to the telescope drive bracket and configured to telescopically move the upper jacket relative to the lower jacket; and
    a telescope actuator trunnion coupled to the drive bracket, the telescope drive bracket is attached to the upper jacket with at least one shear pin and to an energy-absorbing strap through at least one second pin, the telescope drive bracket, telescope actuator, and second pin being configured to retain a first end of the strap while a second end of the strap moves with the upper jacket.

14. The steering column according to claim 13, wherein the telescope drive bracket defines a body portion, a base portion, and an aperture extending through the body portion configured to receive a leadscrew.

15. The steering column according to claim 14, wherein the aperture is sized to permit the leadscrew to move freely through the aperture.

16. The steering column according to claim 14, wherein the base portion of the telescope drive bracket has at least one leg that defines at least one slot configured to receive the shear pin.

17. The steering column according to claim 14, wherein the body portion of the telescope drive bracket defines at least one slot configured to receive the second pin.

18. The steering column according to claim 14, wherein the telescope drive bracket provides a link between the telescope actuator and upper jacket for telescopic movement of the upper jacket.

19. The steering column according to claim 8, wherein the telescope drive bracket is configured to transmit generally linear motion from the telescope actuator via the leadscrew through the telescope actuator trunnion to the upper jacket during telescopic movement of the upper jacket.

* * * * *